United States Patent
Boutaghou

(10) Patent No.: US 6,535,359 B1
(45) Date of Patent: Mar. 18, 2003

(54) INERTIAL LATCH FOR MOBILE AND SMALL DISC DRIVES

(75) Inventor: Zine Eddine Boutaghou, Vadnais Heights, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/579,764

(22) Filed: May 26, 2000

Related U.S. Application Data

(60) Provisional application No. 60/150,719, filed on Aug. 25, 1999.

(51) Int. Cl.[7] ................................................. G11B 5/55
(52) U.S. Cl. ................................................. 360/256.4
(58) Field of Search ..................... 360/256.4; 297/463.1, 297/463.2, 216.1, 216.13, 216.14, 354.1, 366–367, 378.11, 378.12

(56) References Cited

U.S. PATENT DOCUMENTS

| | | | |
|---|---|---|---|
| 4,996,617 A | 2/1991 | Yaeger et al. ................ 360/105 |
| 5,157,566 A | 10/1992 | Hishikawa et al. ...... 360/99.08 |
| 5,189,576 A | 2/1993 | Morehouse et al. ........ 360/105 |
| 5,296,986 A | 3/1994 | Morehouse et al. ........ 360/106 |
| 5,305,170 A | * | 4/1994 | Dion ....................... 360/256.4 |
| 5,346,281 A | * | 9/1994 | Hughes ................. 297/216.14 |
| 5,377,065 A | 12/1994 | Morehouse et al. ........ 360/105 |
| 5,404,257 A | 4/1995 | Alt et al. ................... 360/105 |
| 5,448,436 A | 9/1995 | Albrecht .................... 360/105 |
| 5,579,189 A | 11/1996 | Morehouse et al. ........ 360/105 |
| 5,612,842 A | 3/1997 | Hickox et al. .............. 360/105 |
| 5,689,386 A | 11/1997 | Moorehouse et al. .... 360/97.02 |
| 5,722,730 A | * | 3/1998 | McKernan .................. 16/328 |
| 5,742,455 A | 4/1998 | Boutaghou ................. 360/105 |
| 5,760,986 A | 6/1998 | Morehouse et al. .......... 360/67 |
| 5,870,256 A | 2/1999 | Khanna et al. ............. 360/105 |

* cited by examiner

Primary Examiner—George J. Letscher
(74) Attorney, Agent, or Firm—Derek J. Berger

(57) ABSTRACT

An inertial latch that reduces the likelihood of damage due to secondary bouncing of the latch off of the actuator. An information system including a disc drive having a inertial lock including a latch and a latch receiver. The latch receiver located on the latch end of an actuator having a plurality of mating surfaces that engage with the latch. The latch may also have a plurality of teeth defining mating surfaces. The plurality of teeth may define a plurality of notches and opposed pairs of mating surfaces. The opposed pairs of mating surfaces may have a first mating surface and a second mating surface. The latch may have a latch point with opposed sides having a first opposed side and a second opposed side. The first mating surface may be engagable with the first opposed side and the second mating surface may be engagable with the second opposed side.

16 Claims, 8 Drawing Sheets

INERTIAL LATCH FOR MOBILE AND SMALL DISC DRIVES

RELATED APPLICATION

This application claims the benefit of U.S. Provisional Application Ser. No. 60/150,719, filed Aug. 25, 1999 under 35 U.S.C. 119(e).

FIELD OF THE INVENTION

The present invention relates to the field of mass storage devices. More particularly, this invention relates to an inertial latch in a disc drive.

BACKGROUND OF THE INVENTION

One key component of any computer system is a device to store data. Computer systems have many different places where data can be stored. One common place for storing massive amounts of data in a computer system is on a disc drive. The most basic parts of a disc drive are a disc that is rotated, an actuator that moves a transducer to various locations over the disc, and electrical circuitry that is used to write and read data to and from the disc. The disc drive also includes circuitry for encoding data so that it can be successfully retrieved and written to the disc surface. A microprocessor controls most of the operations of the disc drive as well as passing the data back to the requesting computer and taking data from a requesting computer for storing to the disc.

The transducer is typically placed on a small ceramic block, also referred to as a slider, that is aerodynamically designed so that it flies over the disc. The slider is passed over the disc in a transducing relationship with the disc. Most sliders have an air-bearing surface ("ABS") which includes rails and a cavity between the rails. When the disc rotates, air is dragged between the rails and the disc surface causing pressure, which forces the head away from the disc. At the same time, the air rushing past the cavity or depression in the air bearing surface produces a negative pressure area. The negative pressure or suction counteracts the pressure produced at the rails. The slider is also attached to a load spring which produces a force on the slider directed toward the disc surface. The various forces equilibrate so the slider flies over the surface of the disc at a particular desired fly height. The fly height is the distance between the disc surface and the transducing head, which is typically the thickness of the air lubrication film. This film eliminates the friction and resulting wear that would occur if the transducing head and disc were in mechanical contact during disc rotation. In some disc drives, the slider passes through a layer of lubricant rather than flying over the surface of the disc.

Information representative of data is stored on the surface of the storage disc. Disc drive systems read and write information stored on tracks on storage discs. Transducers, in the form of read/write heads attached to the sliders, located on both sides of the storage disc, read and write information on the storage discs when the transducers are accurately positioned over one of the designated tracks on the surface of the storage disc. The transducer is also said to be moved to a target track. As the storage disc spins and the read/write head is accurately positioned above a target track, the read/write head can store data onto a track by writing information representative of data onto the storage disc. Similarly, reading data on a storage disc is accomplished by positioning the read/write head above a target track and reading the stored material on the storage disc. To write on or read from different tracks, the read/write head is moved radially across the tracks to a selected target track. The data is divided or grouped together on the tracks. In some disc drives, the tracks are a multiplicity of concentric circular tracks. In other disc drives, a continuous spiral is one track on one side of a disc drive. Servo feedback information is used to accurately locate the transducer. The actuator assembly is moved to the required position and held very accurately during a read or write operation using the servo information.

When the disc drive is not operating the actuator assembly is rotated away from and parked in a parking area. Because of the adverse consequences if the actuator contacts or impacts the data region of the disc, disc drives that park the actuator typically have some type of actuator lock to prevent the actuator from moving the carrier toward the data region of the disc in the event of external shock. Passive magnetic or spring locks apply restraining forces that are overcome when the drive is turned on and the actuator is activated. Passive locks are subject to failure in the presence of a sudden external force, the solenoid locks are unreliable, and inertial rotary locks have been found to be inoperable in the presence of an external force that causes the parked actuator to move into its crash stop.

One such inertial lock is shown in U.S. Pat. No. 5,448,436 assigned to IBM, which discloses an inertial latch that attempts to equate the frequency of bouncing of the actuator and the latch. However, this lock is subject to problems with secondary bouncing. During the primary latch-actuator engagement the latch tends to bounce off the actuator. The latch must then consistently reengage the actuator on secondary latch-actuator engagements. However, the latch sometimes fails to engage the actuator on secondary engagements allowing the actuator to damage the disc drive.

What is needed is a disc drive with a inertial lock that overcomes bouncing during latch-actuator engagement, particularly secondary latch bouncing.

SUMMARY OF THE INVENTION

The present invention includes an inertial latch that reduces the likelihood of damage due to secondary bouncing of the latch off of the actuator.

The present invention includes an information system including a disc drive having an inertial lock having a latching mechanism including a latch and a latch receiver. The latch receiver is located on the latch end of an actuator. The latching mechanism has a plurality of mating surfaces that engage between the latch and the latch receiver. The plurality of mating surfaces are located on the latch or the latch receiver.

The disc drive may include a latching mechanism with a plurality of teeth defining mating surfaces. The plurality of teeth may define a plurality of notches and opposed pairs of mating surfaces. The opposed pairs of mating surfaces may have a first mating surface and a second mating surface. The latching mechanism may have a latch point with opposed sides having a first opposed side and a second opposed side. The first mating surface may be engagable with the first opposed side and the second mating surface may be engagable with the second opposed side.

The present invention provides an inertial latch that reduces the likelihood of damage due to secondary bouncing of the latch off of the actuator. In addition, the present invention provides better reliability, with fewer failures. The present invention provides-better shock resistance and reduces stiction.

DESCRIPTION OF THE PREFERRED EMBODIMENT

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

The invention described in this application is useful with all mechanical configurations of disc drives having either rotary or linear actuation. In addition, the invention is also useful in all types of disc drives including hard disc drives, zip drives, floppy disc drives and any other type of drives where unloading the transducer from a surface and parking the transducer may be desirable.

Figure 1:
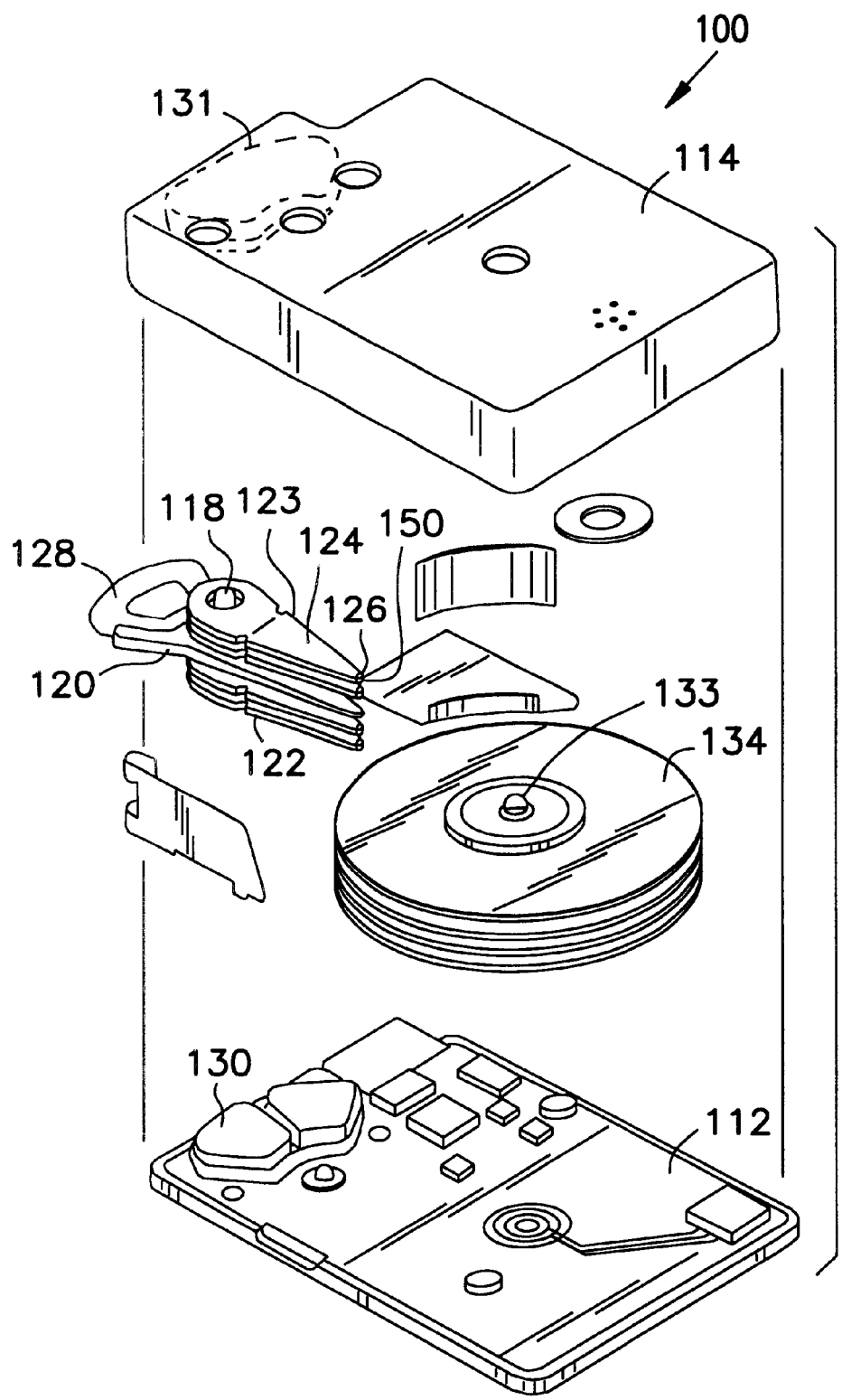
FIG. 1 is an exploded view of a disc drive with a multiple disc stack and a ramp assembly for loading and unloading transducers to and from the surfaces of the discs.

FIG. 1 is an exploded view of one type of a disc drive 100 having a rotary actuator. The disc drive 100 includes a housing or base 112, and a cover 114. The base 112 and cover 114 form a disc enclosure. Rotatably attached to the base 112 on an actuator shaft 118 is an actuator assembly 120. The actuator assembly 120 includes a comb-like structure 122 having a plurality of arms 123. Attached to the separate arms 123 on the comb 122, are load beams or load springs 124. Load beams or load springs are also referred to as suspensions. Attached at the end of each load spring 124 is a slider 126 which carries a magnetic transducer 150. The slider 126 with the transducer 150 form what is many times called the head. It should be noted that many sliders have one transducer 150 and that is what is shown in the figures. It should also be noted that this invention is equally applicable to sliders having more than one transducer, such as what is referred to as an MR or magneto resistive head in which one transducer 150 is generally used for reading and another is generally used for writing. On the end of the actuator arm assembly 120 opposite the load springs 124 and the sliders 126 is a voice coil 128.

Attached within the base 112 is a first magnet 130 and a second magnet 131. As shown in FIG. 1, the second magnet 131 is associated with the cover 114. The first and second magnets 130, 131 and the voice coil 128 are the key components of a voice coil motor which applies a force to the actuator assembly 120 to rotate it about the actuator shaft 118. Also mounted to the base 112 is a spindle motor. The spindle motor includes a rotating portion called the spindle hub 133. In this particular disc drive, the spindle motor is within the hub. In FIG. 1, a number of discs 134 are attached to the spindle hub 133. In other disc drives a single disc or a different number of discs may be attached to the hub. The invention described herein is equally applicable to disc drives which have a plurality of discs as well as disc drives that have a single disc. The invention described herein is also equally applicable to disc drives with spindle motors which are within the hub 133 or under the hub.

Figure 2:
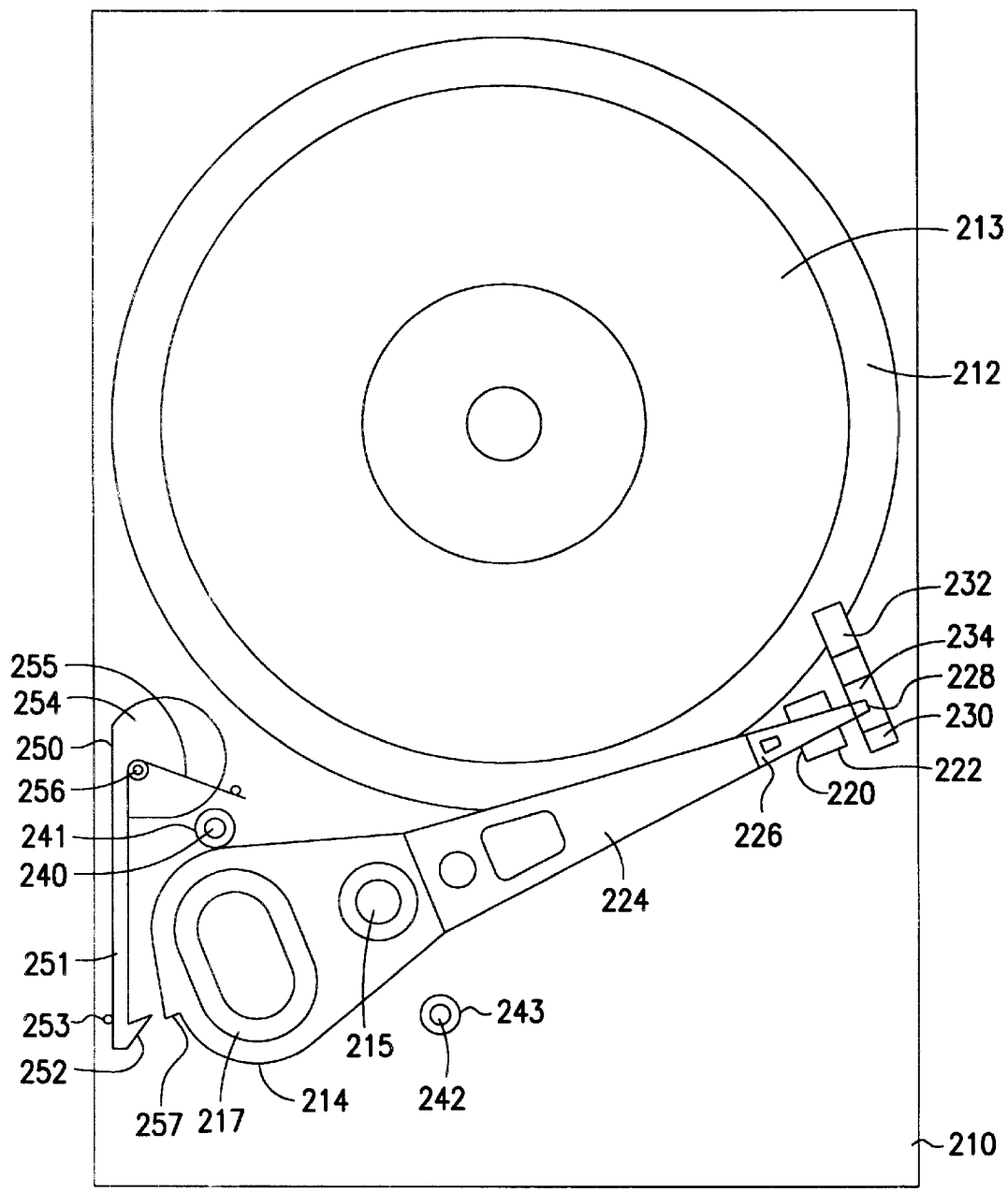
FIG. 2 is a top view of a prior art disc drive with an actuator and an inertial latch.

Referring to FIG. 2, there is illustrated a top view of the interior of a prior art disc drive with the housing cover removed. For ease of illustration and explanation, the disc drive depicted in FIG. 2 is shown as having a single recording head and associated disc surface, although conventional disc drives typically have multiple heads and discs. The disc drive comprises a housing base 210 to which are secured a disc drive or spindle motor with attached disc 212, a rotary actuator 214, a load/unload ramp 230, and a rotary inertial lock 250. The base 210 and a cover (not shown) provide a substantially sealed housing for the disc drive.

The disc 212 has a data region 213 and includes a thin film of conventional perfluoro-polyether (PFPE) lubricant on its surface.

The rotary actuator 214 rotates on a pivot 215 mounted to base 210. Actuator 214 is typically a balanced rotary voice coil motor (VCM) actuator having a coil 217 that moves through the fixed magnetic field of a magnet assembly (not shown) mounted to base 210. An outside diameter (OD) crash stop 240 and an inside diameter (ID) crash stop 242 are mounted to base 210 to limit the travel of rotary actuator 214. The crash stops may be rigid posts with elastomeric O-rings, such as O-rings 241, 243 on crash stops 240, 242, respectively. Alternatively, the crash stops may be rubber bumpers or resilient cantilever beams. The actuator 214 has on the end opposite coil 217 a rigid arm 224. A suspension 226 is attached to the end of actuator arm 224. The suspension 226 may be a conventional type of suspension such as the well-known Watrous suspension, as described in U.S. Pat. No. 4,167,765 assigned to IBM. The suspension 226 supports the head carrier or air-bearing slider 222 and includes a tab 228 that extends beyond the slider 222. A read/write head or transducer 220 is formed on the trailing end of slider 222. Transducer 220 may be an inductive read and write transducer or an inductive write transducer with a magneto resistive (MR) read transducer formed by thin film deposition techniques as is known in the art.

A load/unload ramp 230 having a ramp portion 232 and a recess 234 is mounted to the base 210. Ramp 230 supports the suspension tab 228 in its recess 234 and thus serves as the parking location for actuator 214 when the disc drive is not operating. FIG. 2 illustrates the actuator 214 parked, i.e., suspension tab 228 residing in ramp recess 234 and the actuator 214 forced against the O-ring 241 of OD crash stop 240. If the disc drive were a CSS disc drive, then the actuator 214 would be parked against the O-ring 243 of ID crash stop 242 and the slider 222 would be at rest on a textured nondata landing zone at the ID region of the disc 212. A passive actuator lock or a solenoid lock would be used to keep the actuator 214 parked with the slider 222 at the landing zone.

A rotary inertial lock 250 is also mounted on base 210 and includes an arm 251 having a tip 252, a latch stop 253, a counterweight 254, and a torsion spring 255. The inertial lock 250 is a rigid body, rotationally balanced, that rotates on a pivot 256 mounted to base 210. Pivot 256 is parallel to pivot 215 of actuator 214. The torsion spring 255 (or other means) urges the arm 251 up against latch stop 253 to hold the lock in its open position, which allows free rotation by the actuator 214, as shown in FIG. 2.

Figure 3:
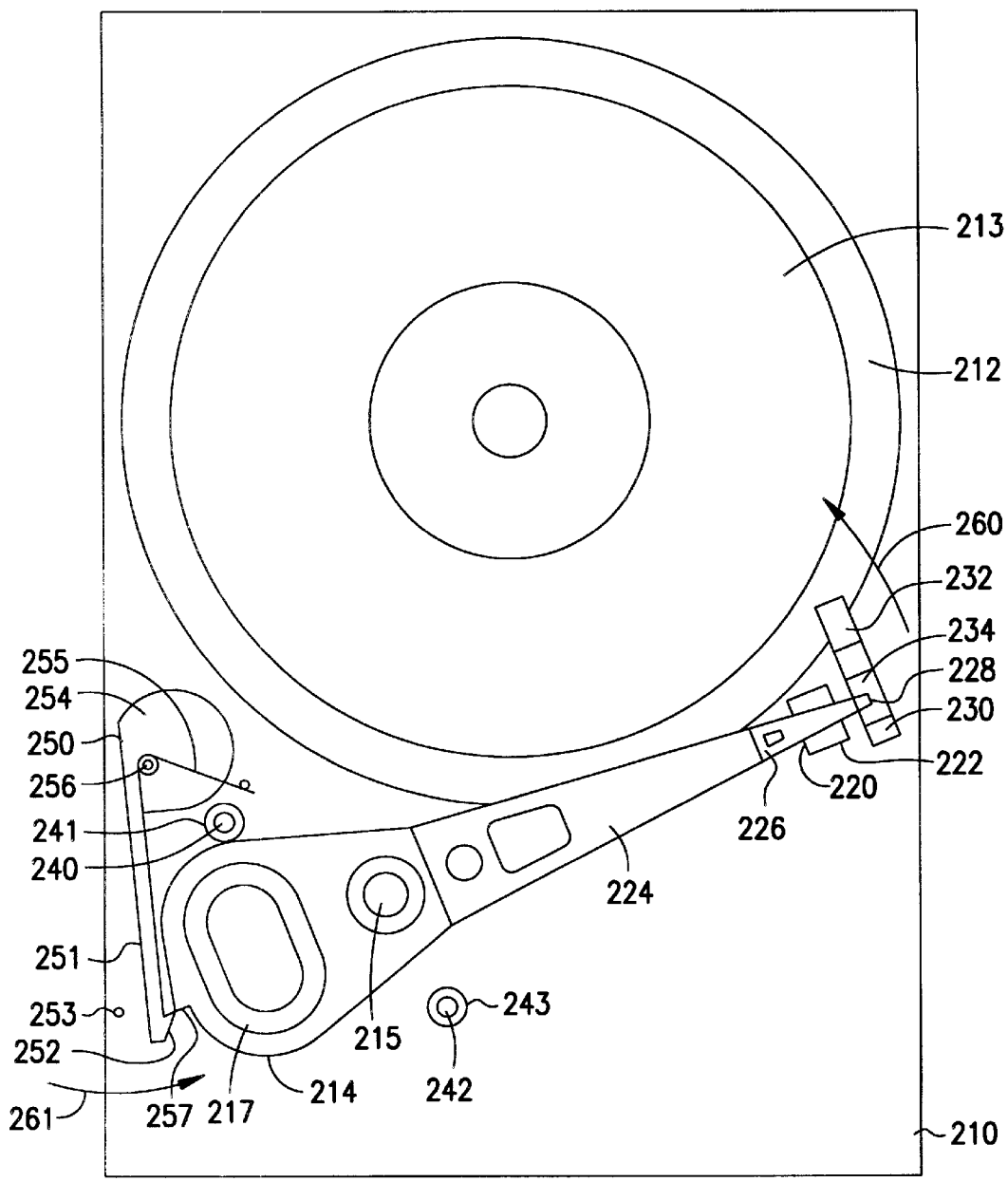
FIG. 3 is a top view of a prior art disc drive with an actuator and an inertial latch.

When the rotary lock is in the locked position (see FIG. 3), the tip 252 is engaged with a mating surface 257 on actuator 214, which prevents actuator 214 from moving the suspension tab 228 off the ramp recess 234. FIG. 3 shows the latch tip 252 and the actuator mating surface 257 at an imaginary engagement point 259, which is the intersection of the circular arcs formed by the tip 252 and mating surface 257. If the disc drive were a CSS disc drive, the rotary lock 250 would be designed to rotate in the opposite direction from that shown in FIG. 2 and would be located on the other side of actuator 214 near crash stop 242.

During read/write operations of the disc drive, the drive motor rotates the disc 212 at a constant speed, and the actuator 214 rotates about pivot 215 to move the slider 222 generally radially across the surface of the disc 212 so that the read/write transducer 220 may access different data tracks on the data region 213. The arm 251 of rotary lock 250 is biased against latch stop 253 by spring 255 so that actuator 214 is free to rotate about pivot 215. The suspension 226 provides a loading force to the slider 222 to urge it toward the surface of disc 212. The data detected from disc 212 by the transducer 220 is processed into a data readback signal by signal amplification and processing circuitry (not shown). When the disc drive is powered down, the actuator 214 is driven toward ramp 230 while the disc 212 is still rotating. The suspension tab 228 contacts the ramp portion 232, moves up the ramp portion 232 and off the disc 212, and comes to rest in ramp recess 234. At this time, the actuator 214 is parked and pressed against O-ring 241 of OD crash stop 240.

FIG. 3 shows how the conventional rotary inertial lock 250 works to keep the actuator in this parked position when the drive is not operating. When the drive undergoes a rotational acceleration in the clockwise direction (e.g., when the drive is accidentally dropped or subjected to sudden impact), all bodies inside the drive experience a torque in the direction indicated by arrow 260, i.e., counterclockwise relative to the drive. If no lock is present, the rotary actuator 214 may rotate away from OD crash stop 240 to move the suspension tab off the ramp 230 and allow the slider 222 to enter the data region 213 of the disc 212. As described above, this could damage the head, disc, or suspension, or allow the slider to come to rest on the disc, thereby presenting the stiction problem. However, the rotary inertial lock 250 also experiences the same torque as the actuator 214 and is also free to rotate in the same direction. By appropriate design of the lock 250, the arm 251 will then rotate about pivot 256 away from latch stop 253 (in the direction indicated by arrow 261) and reach the engagement point 259 before the mating surface 257. The rotating actuator 214 will thus be prevented from moving away from its parked location because, shortly after it begins to rotate, the mating surface 257 will intercept the latch tip 252 near the engagement point 259.

Figure 4:
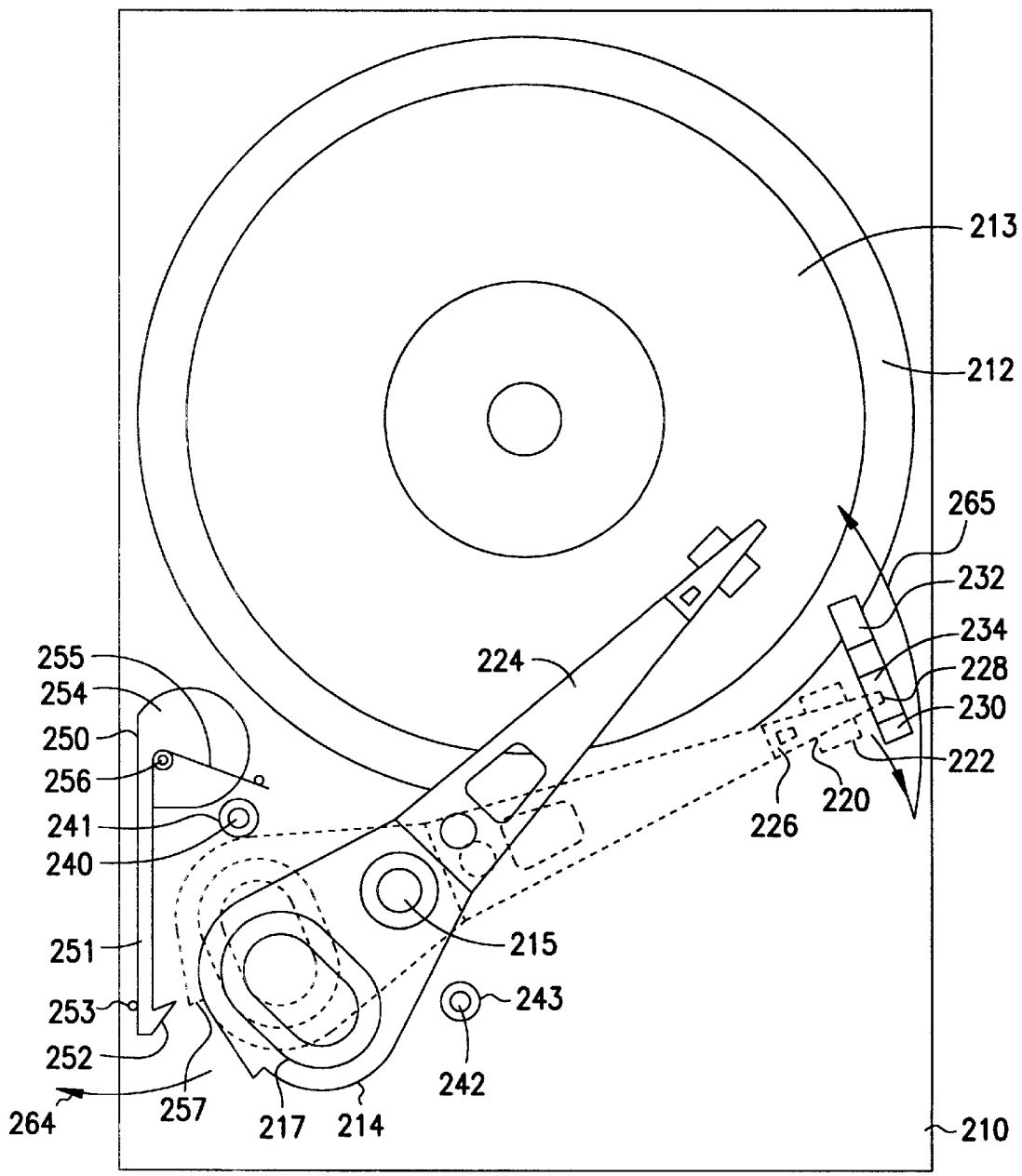
FIG. 4 is a top view of a prior art disc drive with an actuator and an inertial latch.

The prior art rotary latch 250 only functions if the external torque is in the direction tending to move actuator 214 away from OD crash stop 240. However, if the drive is subjected to an external torque that tends to force actuator 214 into crash stop 240 (i.e., the actuator 214 shown by dotted lines in FIG. 4 is rotated clockwise as shown by arrow 262), the latch arm 251 will be driven into latch stop 253 (in the direction indicated by arrow 264). The crash stop 240 has the elastic O-ring 241 which is designed to cushion impacts as the actuator 214 reaches the end of its allowed travel in the OD direction. The actuator 214 will bounce off the crash stop 240 and travel back in the direction of the disc 212, as shown by arrow 265. However, the rotary inertial lock 250, being essentially an inelastic system, will not work to engage the actuator 214. Thus, the actuator 214 can bounce onto the disc 212 with no response from lock 250. The acceleration caused by the external torque only serves to hold the latch arm 251 open, while the actuator 214 bounces off its crash stop 240 onto the disc 212.

Figure 5:
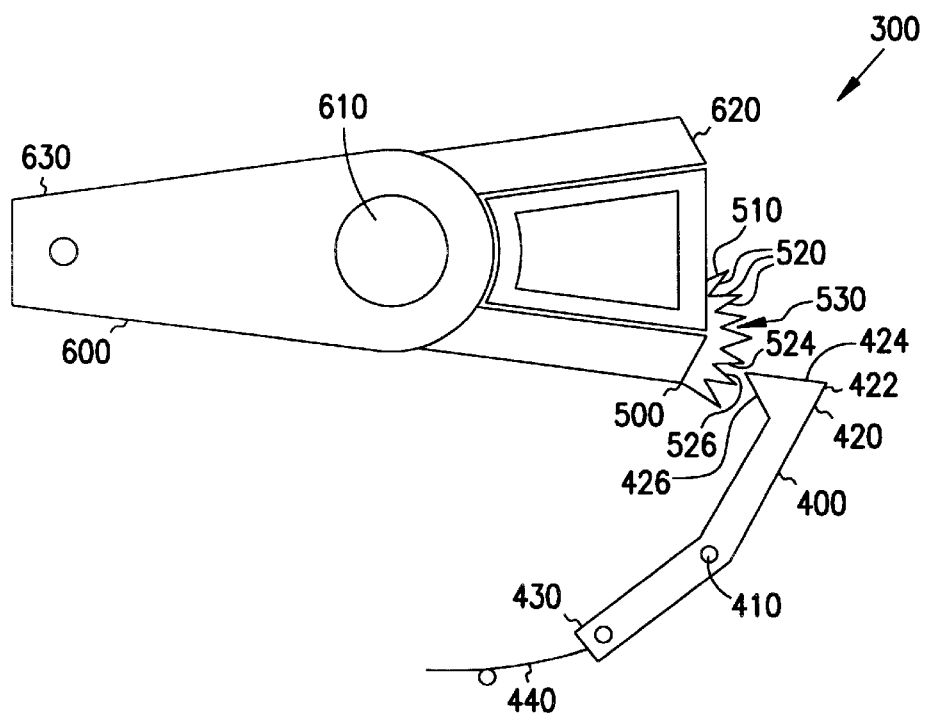
FIG. 5 is a partial top view of a disc drive showing one embodiment of an actuator and a latching mechanism of the present invention in a disengaged position.
Figure 6:
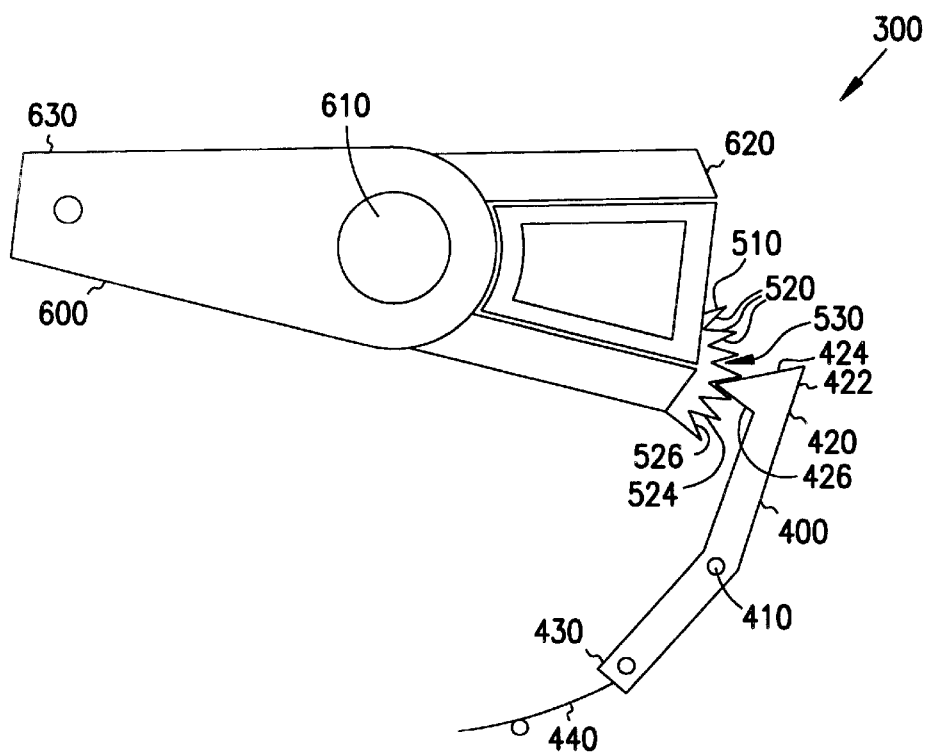
FIG. 6 is a partial top view of a disc drive showing one embodiment of an actuator and a latching mechanism of the present invention in an engaged position.

As shown in FIG. 5 and FIG. 6, one embodiment of the present invention includes a latching mechanism 300 including a latch 400 and a latch receiver 500. The latch receiver 500 is located on a latch end 620 of an actuator 600. The actuator 600 also has an actuator pivot 610 and a suspension end 630.

The latch 400 has a latch pivot 410, an engaging end 420, and a spring end 430. The latch pivot 410 is parallel to the actuator pivot 610. The engaging end 420 has a latch point 422.

FIG. 5 shows latch 400 disengaged from latch receiver 500. FIG. 6 shows latch 400 engaged with latch receiver 500. Latch receiver 500 has a plurality of teeth 510 and a plurality of mating surfaces 520. Latch point 422 is received in a notch 530 defined by a pair of teeth 510. Alternatively, the plurality of teeth 510 are located on latch 400 and likewise, latch point 422 is located on actuator 600. Locating plurality of teeth 510 on latch 400 results in a preferably lighter actuator 600.

Latch receiver 500 may have a plurality of notches 530 sized to mate with and engage latch point 422. Latch point 422 is engaged in a notch 530. Notch 530 has a plurality of mating surfaces 520. Pairs of mating surfaces 520 engage opposed sides of latch point 422 so that the latch 400 does not bounce off of the first engaging surface of actuator 600. Notch 530 has a first mating surface 524 and a second mating surface 526 that are positioned to engage with first opposed side 424 and second opposed side 426. Latch 400 engages actuator 600 at first mating surface 524 and first opposed side 424. Actuator 600 maintains engagement of latch 400 and does not bounce off of latch 400 because the latch also engages second mating surface 526 and second opposed side 426. Depending on the direction of rotation of the actuator 600, the latch 400 may first engage second mating surface 526 and second opposed side 426. Multiple notches 530 in latch receiver 500 allow latch 400 to engage actuator 600 at multiple points. Multiple notches 530 increases the likelihood that latch 400 will engage actuator 600 with minimal secondary bouncing. Multiple notches 530 also increases the chance that the latch 400 will engage actuator 600 at lower momentum. If latch 400 becomes disengaged there is a spring 440 biasing latch 400 to reengage one of the notches 530 of actuator 600. The latch 400 engages the same notch or another of the multiple notches.

Figure 7:
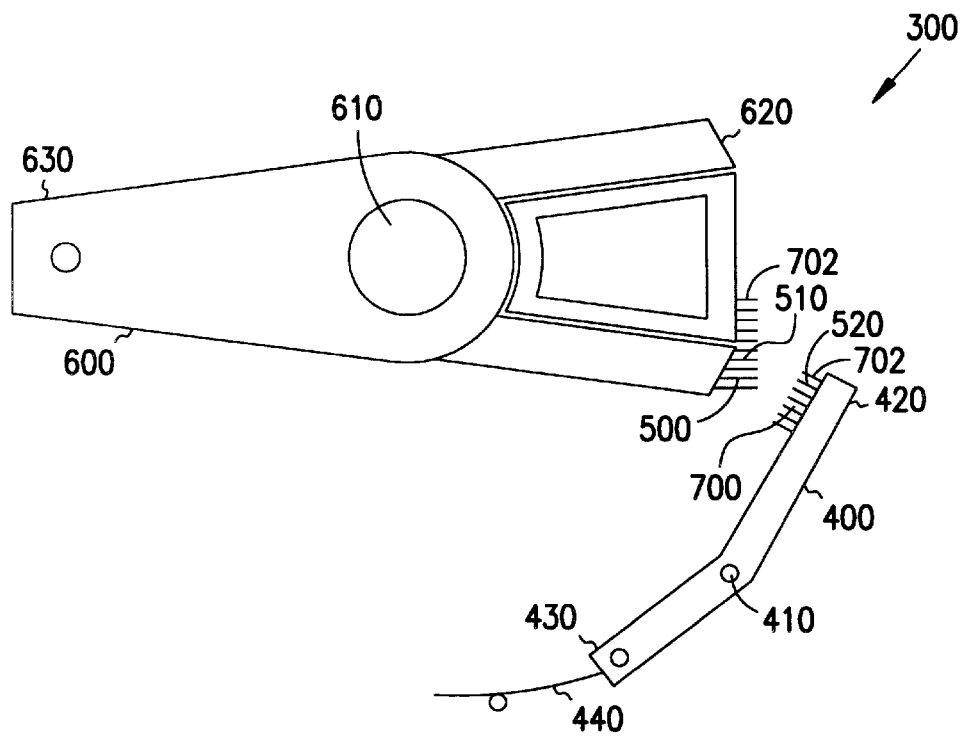
FIG. 7 is a partial top view of a disc drive showing one embodiment of an actuator and a latching mechanism including fine and flexible teeth.

As shown in FIG. 7, one embodiment of the present invention includes a latching mechanism 300 including a latch 400 and a latch receiver 500. The latch receiver 500 is located on a latch end 620 of an actuator 600. The actuator 600 also has an actuator pivot 610 and a suspension end 630.

The latch 400 has a latch pivot 410, an engaging end 420, and a spring end 430. The latch pivot 410 is parallel to the actuator pivot 610. The engaging end 420 has an engaging surface 700 that engages with latch receiver 500. Alternatively, the plurality of teeth 5 10 are located on latch 400 and likewise, engaging surface 700 is located on actuator 600.

Engaging surface 700 and latch receiver 500 may have fine and flexible teeth 702. The fine and flexible teeth 702 provide multiple mating surfaces between the latch receiver 500 and engaging surface 700. The fine and flexible teeth 702 maybe injection molded on both latch 400 and actuator 600. The use of fine and flexible teeth 702 creates a reaction force based on both elastic deformation and friction during engagement. The fine and flexible teeth create normal as well as tangential forces to prevent the actuator from landing on the disc due to rotational shock events. The fine and flexible teeth could also be Velcro or other hook and loop fabric.

The multiple mating surfaces of the engaging surface and the plurality of teeth allow latch 400 to engage actuator 600 at multiple points increasing the likelihood that latch 400 will engage actuator 600 with minimal secondary bouncing. Multiple mating surfaces also increases the chance that the latch 400 will engage actuator 600 at lower momentum. If latch 400 becomes disengaged there is a spring 440 biasing latch 400 to reengage the actuator 600. The latch 400 engages at the same location or another location on the engaging surface.

Figure 8:
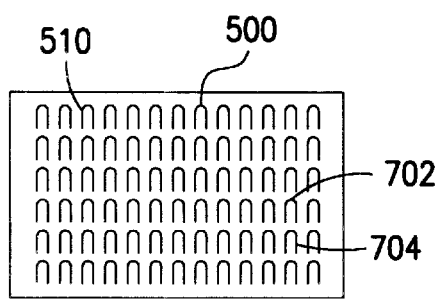
FIG. 8 is a partial top view of a disc drive showing one embodiment of a latch receiver.
Figure 9:
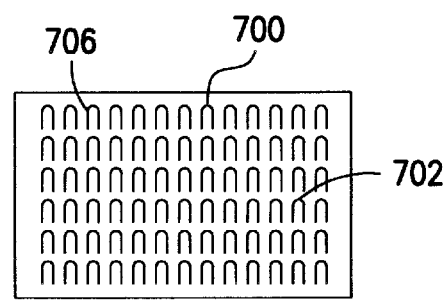
FIG. 9 is a partial top view of a disc drive showing one embodiment of an engaging surface.

FIG. 8 and FIG. 9 show the fine and flexible teeth 702 of engaging surface 700 and latch receiver 510 in greater detail. The engaging surface 700 and latch receiver 510 comprise a randomly distributed array of interlocking fine and flexible teeth 702. FIG. 8 shows latch receiver 510 with a plurality of hooks 704 and FIG. 9 shows engaging surface 700 with a plurality of loops 706 for engaging the hooks 704 of latch receiver 510. Alternatively, the hooks 704 are on the engaging surface 700 and the loops are on the latch receiver 510.

Figure 10:
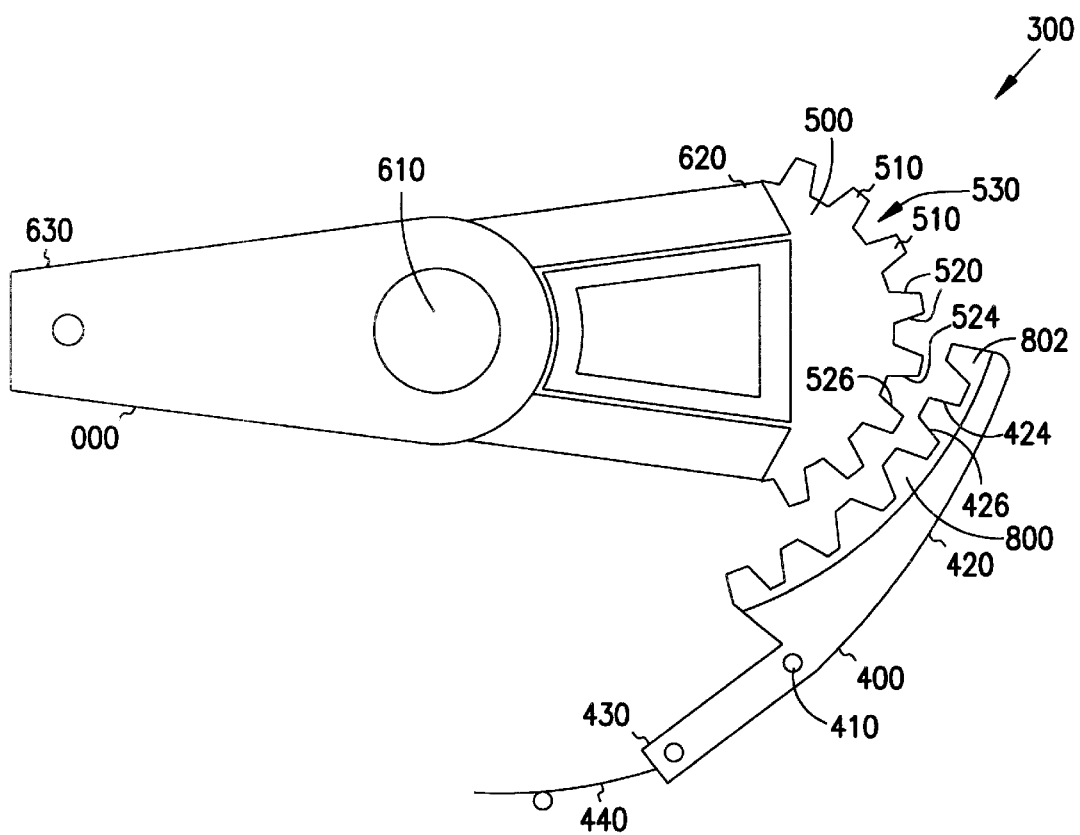
FIG. 10 is a partial top view of a disc drive showing one embodiment of an actuator and a latching mechanism including a gear like geometry.

As shown in FIG. 10, one embodiment of the present invention includes a latching mechanism 300 including a latch 400 and a latch receiver 500 with a gear like geometry for ease of engagement. The latch receiver 500 is located on a latch end 620 of an actuator 600. The actuator 600 also has an actuator pivot 610 and a suspension end 630.

The latch 400 has a latch pivot 410, an engaging end 420, and a spring end 430. The latch pivot 410 is parallel to the actuator pivot 610. The engaging end 420 has a gear 800.

Latch receiver 500 has a plurality of teeth 510 and a plurality of mating surfaces 520. Gear 800 is received between notches 530 defined by pairs of teeth 510. Alternatively, the plurality of teeth 510 are located on latch 400 and likewise, gear 800 is located on actuator 600.

Latch receiver 500 may have a plurality of notches 530 sized to mate with and engage gear 800. Gear 800 is engaged in a notches 530. Notches 530 have a plurality of mating surfaces 520. Pairs of mating surfaces 520 engage opposed sides of the gear teeth 802 of gear 800 so that the latch 400 does not bounce off of the first engaging surface of actuator 600. Notch 530 has a first mating surface 524 and a second mating surface 526 that are positioned to engage with first opposed side 424 and second opposed side 426. Latch 400 engages actuator 600 at first mating surface 524 and first opposed side 424. Actuator 600 maintains engagement of latch 400 and does not bounce off of latch 400 because the latch also engages second mating surface 526 and second opposed side 426. Depending on the direction of rotation of the actuator 600, the latch 400 may first engage second mating surface 526 and second opposed side 426. Multiple notches 530 in latch receiver 500 allow latch 400 to engage actuator 600 at multiple points at the same time. In addition, the notches 530 and gear teeth 802 are equally sized and spaced creating multiple engagement positions. Multiple notches 530 and multiple gear teeth 802 increases the likelihood that latch 400 will engage actuator 600 with minimal secondary bouncing. Multiple notches 530 and multiple gear teeth 802 also increases the chance that the latch 400 will engage actuator 600 at lower momentum. If latch 400 becomes disengaged there is a spring 440 biasing latch 400 to reengage the notches 530 of actuator 600. The latch 400 engages at the same notch or another of the multiple notches.

The present invention provides an inertial latch that reduces the likelihood of damage due to secondary bouncing of the latch off of the actuator. In addition, the present invention provides better reliability, with fewer failures. The present invention provides better shock resistance and reduces stiction.

Figure 11:
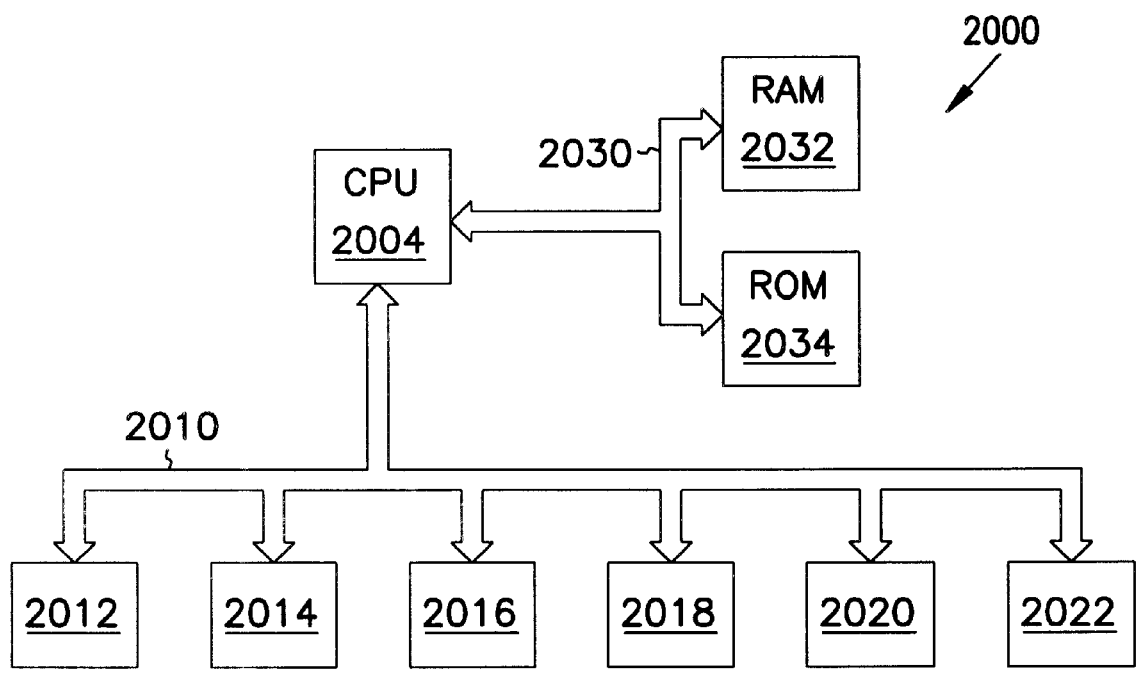
FIG. 11 is a schematic view of a computer system.

FIG. 11 is a schematic view of a computer system. Advantageously, the invention is well-suited for use in a computer system 2000. The computer system 2000 may also be called an electronic system or an information handling system and includes a central processing unit, a memory and a system bus. The information handling system includes a central processing unit 2004, a random access memory 2032, and a system bus 2030 for communicatively coupling the central processing unit 2004 and the random access memory 2032. The information handling system 2002 includes a disc drive device which includes the ramp described above. The information handling system 2002 may also include an input/output bus 2010 and several devices peripheral devices, such as 2012, 2014, 2016, 2018, 2020, and 2022 may be attached to the input output bus 2010. Peripheral devices may include hard disc drives, magneto optical drives, floppy disc drives, monitors, keyboards and other such peripherals. Any type of disc drive may use the method for loading or unloading the slider onto the disc surface as described above.

In conclusion, an inertial lock having a latching mechanism 300 including a latch 400 and a latch receiver 500 is disclosed. Latch receiver 500 is located on the latch end 620 of an actuator 600. The latching mechanism 300 has a plurality of mating surfaces 520 engagable between latch 400 and latch receiver 500. The plurality of mating surfaces may be located on latch 400 or latch receiver 500.

The latching mechanism 300 may also include mating surfaces 520 that are opposed pairs of mating surfaces 524, 526. The mating surfaces 520 may be defined by a plurality of teeth 510. The plurality of teeth 510 may define a plurality of notches 530 and opposed pairs of mating surfaces 524, 526. The latching mechanism 300 may also include a latch point 422 with opposed sides 424, 426. The mating surfaces 520 may be opposed pairs of mating surfaces 524, 526. The plurality of teeth 510 may define a plurality of notches 530 and opposed pairs of mating surfaces 524, 526. The opposed pairs of mating surfaces 524, 526 may be engagable with the opposed sides 424, 426. The opposed pairs of mating surfaces 524, 526 may have a first mating surface 524 and a second mating surface 526. The opposed sides 424, 426 may have a first opposed side 424 and a second opposed side 426. The first mating surface 524 may be engagable with the first opposed side 424 and the second mating surface 526 may be engagable with the second opposed side 426. The plurality of mating surfaces 520 may reduce the likelihood of secondary bounce. The plurality of mating surfaces 520 may be fine and flexible teeth 702. The fine and flexible teeth 702 may be injection molded to the latch 400 and the actuator 600. The fine and flexible teeth 702 may have a reaction force based on elastic deformation and friction. The fine and flexible teeth 702 may have normal and tangential forces to lock the actuator 600.

In addition, a disc drive 100 including a latching mechanism 300 having a latch 400 and a latch receiver 500 is disclosed. The latch receiver 500 is located on the latch end 620 of an actuator 600. The latching mechanism 300 has a plurality of mating surfaces 530 engagable between latch 400 and latch receiver 500. The disc drive 100 may also include the latching mechanism 300 described above.

In addition, an information handling system 2002 including a latching mechanism 300 having a latch 400 and a latch receiver 500 is disclosed. The latch receiver 500 is located on the latch end 620 of an actuator 600. The latching mechanism has a plurality of mating surfaces 530 engagable between latch 400 and latching mechanism 500. The information handling system 2002 may also include the latching mechanism 300 described above.

In addition, a method of locking an actuator 600 including the step of engaging an actuator 600 with a latch 400, the actuator 600 and latch 400 having a plurality of mating surfaces 530 is disclosed. Lastly, a latching mechanism 300 including a latch 400 for locking an actuator 600, and a latching means 300 for reducing secondary bounce is disclosed. The present invention provides an inertial latch that reduces the likelihood of damage due to secondary bouncing of the latch off of the actuator.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A disc drive comprising:
   at least one rotatable disc;
   an actuator;
   a latch for preventing movement of the actuator;
   a latch receiver located on the actuator; and
   a plurality of notches on at least one of the latch and the latch receiver, the notches configured to be engaged by a portion of the other of the latch and latch receiver.

2. The disc drive of claim 1 wherein the plurality of notches are located on the latch.

3. The disc drive of claim 1 wherein the plurality of notches are located on the latch receiver.

4. The disc drive of claim 1 wherein each notch comprises an opposed pair of surfaces.

5. The disc drive of claim 4 wherein each opposed pair of surfaces is defined by a plurality of teeth.

6. The disc drive of claim 1 wherein each notch is defined by a plurality of teeth.

7. The disc drive of claim 1 wherein at least one of the latch and the latch receiver comprises a latch point with opposed sides.

8. The disc drive of claim 7 wherein the notch and the latch point are matingly engagable.

9. The disc drive of claim 7 wherein:
   each notch comprises first and second opposed surfaces;
   the opposed sides comprise a first opposed side and a second opposed side and the first opposed surface is engagable with the first opposed side and the second opposed surface is engagable with the second opposed side.

10. The disc drive of claim 1 wherein the plurality of notches reduce the likelihood of secondary bounce.

11. The disc drive of claim 1 wherein the plurality of notches are defined by fine and flexible teeth.

12. The disc drive of claim 11 wherein the fine and flexible teeth are injection molded to the latch and the actuator.

13. The disc drive of claim 11 wherein the fine and flexible teeth have a reaction force based on elastic deformation and friction and the fine and flexible teeth have normal and tangential forces to lock the actuator.

14. A disc drive comprising:
    an actuator;
    a latch for preventing movement of the actuator;
    a latch receiver located on the actuator; and
    at least three teeth on one of the latch and the latch receiver and at least one tooth on the other of the latch and the latch receiver, the at least one tooth being configured to engage two of the at least three teeth.

15. The disc drive of claim 14 wherein:
    the at least three teeth define a plurality of notches, each notch defining an opposed pair of surfaces comprising a first mating surface and a second mating surface;
    the at least one tooth defines a latch point with opposed sides, the opposed sides having a first opposed side and a second opposed side; and
    the first opposed surface is engagable with the first opposed side and the second opposed surface is engagable with the second opposed side.

16. A disc drive comprising:
    at least one rotatable disc;
    an actuator;
    a latch for preventing movement of the actuator; and
    means associated with the latch for reducing secondary bounce of the actuator.

* * * * *